United States Patent [19]

Drain

[11] Patent Number: 4,513,340

[45] Date of Patent: Apr. 23, 1985

[54] POWER TRANSMISSION LINE PROTECTIVE APPARATUS

[75] Inventor: Robert E. Drain, Butte, Mont.

[73] Assignee: The Montana Power Company, Butte, Mont.

[21] Appl. No.: 448,938

[22] Filed: Dec. 13, 1982

[51] Int. Cl.³ .............................................. H02H 3/28
[52] U.S. Cl. ...................................... 361/62; 361/63; 361/87
[58] Field of Search ................. 361/62, 63, 64, 87, 361/42, 44, 45, 46, 47, 48, 49, 50, 93

[56] References Cited

U.S. PATENT DOCUMENTS 2,605,325  7/1952  Glassburn .......................... 361/87

FOREIGN PATENT DOCUMENTS 413557  5/1925  Fed. Rep. of Germany ........ 361/62
27660   of 1914 United Kingdom .................. 361/62
864413  9/1981  U.S.S.R. ................................. 361/87

OTHER PUBLICATIONS

"Directional Overcurrent Ground Relay Types KRP KRC and KRD" Westinghouse Manual No. I.L. 41-137C.

"Type HD Current Balance Relay" Westinghouse Manual No. I.L. 41-176.

Primary Examiner—Harry E. Moose, Jr.
Attorney, Agent, or Firm—Christensen, O'Connor, Johnson & Kindness

[57] ABSTRACT

A fault detection and clearance system for paralleled electrically similar power transmission lines wherein at each end of the line matched separate directional relays respectively connected to trip associated fault clearance circuit breakers have polarized windings and operate windings. The polarized windings are energized by an alternating current proportional to the summation while the operate windings are energized by an alternating current proportional to the difference (phase considered) of fault currents going into the breakers in both lines at the adjacent end in the event of a fault.

6 Claims, 7 Drawing Figures $I_O \propto I_1 + I_2$
$I_R \propto I_1 - I_2$

X = FAULT $I_1 \propto I_{B1} + I_{A2}$
$I_2 \propto I_{B2} - I_{A2}$
BUT $I_{B2} > I_{A2}$
∴ $I_1 > I_2$ $I_1 \propto I_{B1} + I_{A2}$
$I_2 \propto I_{A2} - I_{B2}$
BUT $I_{A2} > I_{B2}$
∴ $I_1 > I_2$ $I_1 \propto I_{B1} - I_{A1}$
$I_2 \propto I_{B2} + I_{A1}$
BUT $I_{B1} > I_{A1}$
∴ $I_2 > I_1$ $I_1 \propto I_{A1} - I_{B1}$
$I_2 \propto I_{A1} + I_{B2}$
BUT $I_{A1} > I_{B1}$
∴ $I_2 > I_1$

POWER TRANSMISSION LINE PROTECTIVE APPARATUS

BACKGROUND OF THE INVENTION

This invention relates to protective apparatus for alternating current electrical power transmission lines, and more particularly to an improved system of protective relaying of two parallel, equal impedance transmission lines connected between otherwise independent power sources. Such improved relaying is accomplished in what may be termed the current balance or transverse differential mode, and is herein illustratively described by reference to the presently preferred embodiments thereof.

Prior to this invention, protective relaying responsive to both phase and ground faults had been practiced by a composite device manufactured, for example, by Westinghouse Electric, known as the Type HD current balance relay. That device constituted a high-speed, inductor-loop relay having double-throw contacts providing balanced current protection of an end of a pair of parallel lines using four relays, namely three phase relays and one ground relay. The system was described in the manufacturer's product manual IL41-176, dated October, 1956, superseding IL41-407C. Its inductor loop, pivoted at each end to move a switch arm, served as the secondary of a small transformer whose primary consisted of two symmetrically tapped windings connected to be energized by a derivative of respective line currents, such that with line currents flowing in the same direction, transformer action-induced loop current was proportional to the prevailing difference between such line currents. The loop was also located in a magnetic flux gap traversed by a magnetic field produced by separate current coils connected to be energized by derivatives of the respective line currents. The connections were such that with equal currents in the lines (the non-fault situation), either in the same direction or in opposite directions, no tripping tendency was produced. This is true in one case because of absence of loop current and in the other case because of absence of flux in the flux gap. However, an unbalance of line currents produced loop torque, tripping the circuit breaker in the faulted line, i.e., that having the higher current.

Use of that prior (HD) device presented serious problems, however, recognition of which led to the present invention. The chief problem, apart from the necessity of providing a relatively complex piece of equipment sensitive to calibrate and to maintain in calibration, lay in the propensity of the device to erratic performance in the presence of high-fault currents in one line or the other. In fact, on occasion, incorrect circuit breaker tripping would occur under fault current conditions, where the current transformers saturate. This is understandable from the torque equation of the HD relay loop, which is as follows:

$$T = K_1(I_1 + I_2)(I_1 - I_2)$$

wherein $K_1$ is a constant and $I_1$ and $I_2$ are the respective transmission line currents. It will be recognized from this equation that with increasing values of line currents, the device becomes increasingly more sensitive to changes in the pervailing difference between line currents, a condition which made calibration difficult and which produced false (and erratic) operation at times due, for example, to current transformer saturation during faults. The present invention overcomes such problems. It provides a system of protection using conventional components. It presents no calibration problem requirements, either initially or to maintain calibration, especially so when components used in the system are made to readily attainable uniformity standards so as to have substantially predictable and matched electrical characteristics. This includes current transformers and conventional directional relays, components that are readily manufactured with a high degree of uniformity. It avoids erratic operation when line currents are high because it operates with essentially the same degree of sensitivity to line current differences under high fault conditions as it does under low fault conditions. This also means that it maintains equal sensitivity to faults producing relatively small fault currents as compared with faults producing relatively high fault currents.

BRIEF SUMMARY OF THE INVENTION

In accordance with this invention, the protective system includes separate directional relays connected to trip the respective line circuit breakers at one end of the lines when energized by operating current at and above the relay's pick up level. Each of the relays has a polarization winding and an associated operate winding. Current detectors such as current transformer loops linked with the transmission line conductors derive control currents proportional to the respective line currents and phased in accordance with line currents, such control currents being summed for energization of the polarization windings of the relays and being subtracted one from the other to produce a difference current for energizing the operate windings of the respective relays. As a result, relative phasing between the summation and difference currents energizing the polarization and operate windings of the relay of a faulted transmission line causes that relay to pick up with its operate winding energized above a predetermined level while the other relay does not pick up with such relative phasing being opposite in such other relay.

In one embodiment disclosed herein, the means energizing the polarization windings of the relays comprise the secondary of a current transformer having primaries connected to the respective current detectors, and the means energizing the operate windings comprise the secondary of a current transformer having primaries connected to the respective current detectors.

In a second embodiment disclosed herein, the means energizing the polarization windings comprise the secondary of a transformer drop compensator producing an output voltage applied to both of said polarization windings, and wherein the means energizing the operate windings comprise the secondary of a current transformer having primaries connected to the respective current detectors.

These and other features, aspects and advantages of the invention will become more fully evident as the description proceeds with reference to the accompanying drawings.

DETAILED DESCRIPTION REFERENCED TO DRAWINGS

Figure 1:
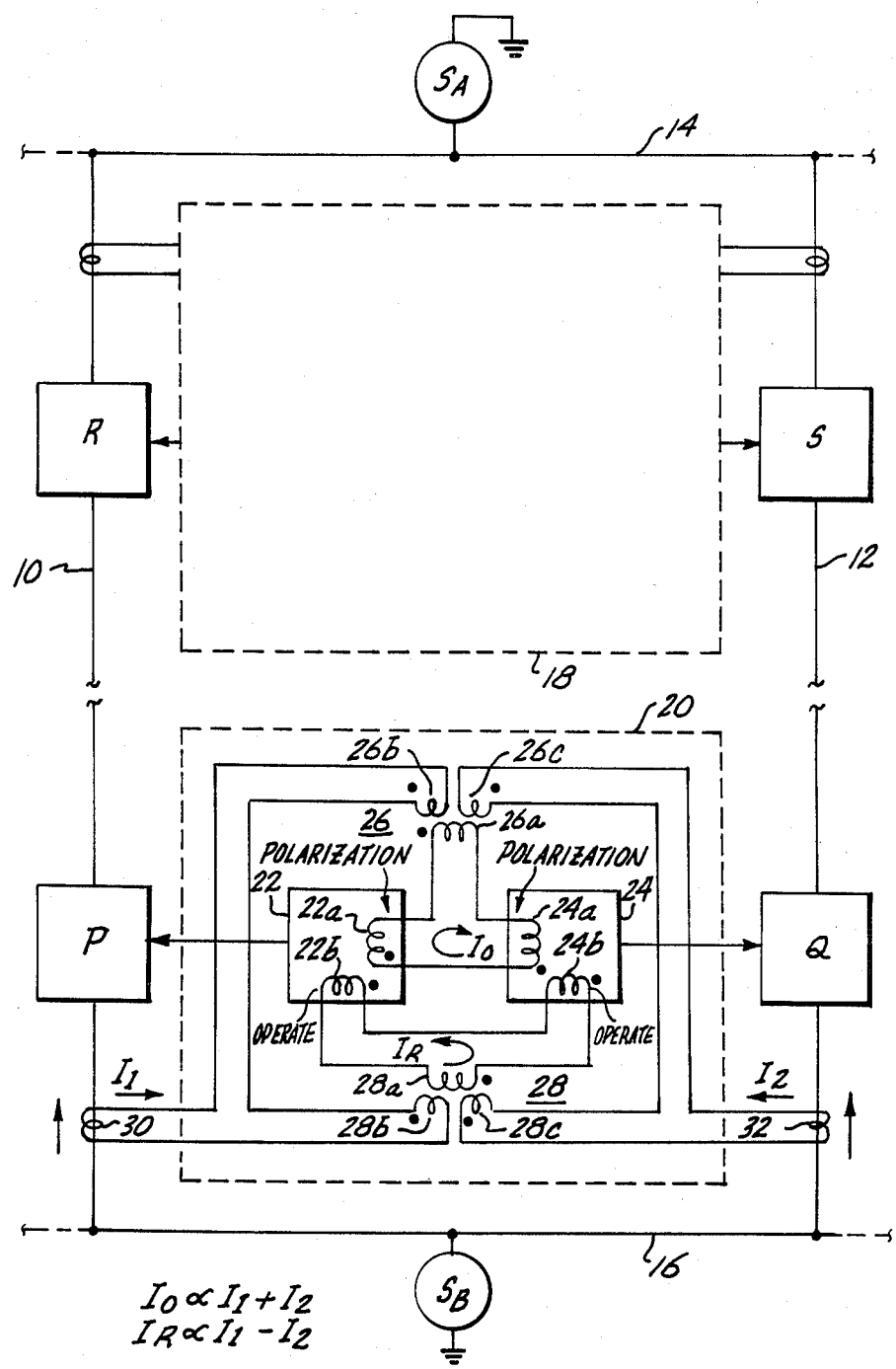
FIG. 1 is a simplified diagram of a system according to the invention with one phase of each of two parallel transmission lines shown under protection and with the system embodiment utilizing current transformers to sense and utilize fault currents to operate breaker tripping relays. Other phases and their similar protection gear are not depicted in the drawing.

In FIG. 1, two similar parallel-connected transmission lines 10 and 12 are depicted schematically as though they represent a single phase, when in fact they are three-phase lines and are intended to serve as network load distribution lines connected between otherwise independent power systems 14 and 16. The system 14 is shown being served by a power source $S_A$ and system 16 by a separate power source $S_B$. Normally, lines 10 and 12, being similar and therefore having substantially equal impedances, carry the same current in one direction or the other depending upon load makeup requirements of the interconnected systems 14 and 16. However, it is, of course, possible on either line for a phase fault or a ground fault to occur on any of the phases. It is therefore necessary that each of the parallel lines 10 and 12 have a fault clearing circuit breaker at or adjacent each of its remote ends connected to the respective power networks 14 and 16 served by the parallel intertie. The essential requirement is that any such fault, regardless of where it occurs along the line between the protective breakers, be sensed immediately and reliably and that the correct breaker be tripped in order to clear the fault. As previously indicated, protective relay gear previously available presented problems of consistent reliability and operation, and particularly so in the case of heavy fault currents, all for the reasons outlined hereinabove. In the illustrated case, each phase of the line has a protective breaker at each end of that line. Lines 10 and 12 have respective circuit breakers P and Q at or adjacent to the network 16, whereas the same lines have protective breakers R and S at or adjacent to the network 14 at their opposite ends.

A fault sensing circuit breaker tripping control unit 20 exercises selective control over operation of circuit breakers P and Q in respective lines 10 and 12 at the ends of those lines adjacent power network 16. A similar unit 18 exercises fault clearing control over breakers R and S adjacent the opposite network 14. Apparatus 20 will now be described as to makeup in its preferred form and as to its functioning to clear faults on transmission line 12 through circuit breaker Q and to clear faults on transmission line 10 through circuit breaker P.

Fault sensor unit 20 includes matched directional relays 22 and 24 having respective polarization windings 22a and 24a and having operate windings 22b and 24b. The polarization windings are serially connected with secondary 26a of current transformer 26. They are connected for energization with relatively opposite polarization polarity, such that with cophasing of currents in the associated operate windings of the relays during a fault to which the system responds, one of the relays will pick up and trip its associated breaker while the other does not. The other relay will pick up and trip its associated breaker with its line faulted. This action takes place provided in each instance, of course, that the amplitude of current in the operate windings in the relay subject to operation is above the relay's pull-in threshold.

The two operate windings are serially connected with the secondary 28a of a second current transformer 28. Current transformers 26 and 28 each have matched dual primaries. One primary 26b, of transformer 26, is serially connected with one primary, 28b, of transformer 28 and with the output winding 30 of a current transformer linked with transmission line 10 and producing a current $I_1$ proportional to current in that line. The remaining primaries 26c and 28c are similarly serially connected with a winding 32 which serves as a current transformer deriving an output current $I_2$ proportional to current in line 12. As will be noted, the relative polarities as between primaries 26b and 28b traversed by current $I_1$ is opposite that as between primaries 26c and 28c traversed by current $I_2$. Thus, as indicated at the bottom of FIG. 1, current $I_0$ passed through polarization windings 22a and 24a is proportional to the sum of currents $I_1$ plus $I_2$. Current $I_R$ passed through the operate windings 22b and 24b is proportional to the difference between currents $I_1$ and $I_2$. Since $I_1$ and $I_2$ are passed through the respective primaries 28b and 28c with opposite phasing due to the winding polarities, the derived secondary current $I_R$ is either in phase with the polarization winding energization or is out of phase with the polarization winding energization in one relay or the other, depending upon which of the transmission lines is faulted. This thereby assures that the fault is cleared immediately and directly (without waiting for external breakers to trip) by tripping circuit breaker, P or Q, in response to the fault.

Preferably, relays 22 and 24 are continuously adjustable within their operating current range (for example, within the range between two amperes and eight amperes per winding), but are separately adjusted so as to pick up at the same preselected current value in their operating windings. In setting these relays, consideration must be given to the degree of inaccuracy of the current transformers for the external fault which creates the greatest secondary current. If, for example, such secondary current is nominally 50 amperes and the current transformer can only be expected to produce a value of secondary current within ±2% of this value, then each current transformer could conceivably be in error by one ampere. Since those errors could occur in opposite senses it is important that the circuit breaker control relays P or Q be set to pick up at a level greater than two amperes; otherwise, incorrect circuit breaker operation will occur. Yet, at the same time, the pick up current level of each relay should be sufficiently low that the protective apparatus will respond to most internal faults without having to await sequential tripping action (i.e., tripping preceded by remote breaker tripping). It will be noted in the present improved system that the protective relays do not lose sensitivity at lower levels of fault current inasmuch as there is no problem with saturation where the operate windings are energized in response to the difference current $I_R$ and wherein the function of the polarization windings is merely to polarize the relays to get directional action, as already indicated.

FIGS. 3 through 7 are provided as an aid to understanding the functioning of the system in its response to faults at various line locations as a means of operating the correct breaker immediately, directly and consistently, and of so doing using simple and reliable conventional components as described. In Case I, where the fault occurs in line 10 near network 14, the flow of fault currents indicated in the diagram (FIG. 4) are so distributed or divided as to yield $I_1$ in phase with $I_2$ so as to produce a summation value of $I_0$. This branching fault values are proportioned relatively to yield $I_1$ and $I_2$ in accordance with the summation of current line lengths each must traverse, assuming linear impedance over the lengths of the lines and, of course, that the lines are substantially similar in their electrical characteristics, as previously indicated.

In Case II, where the fault is located in line 10 near network 16, the line current flowing through the current transformers yielding currents $I_1$ and $I_2$ are opposed, so that $I_0$ is small and $I_R$ is large, yet $I_0$ is sufficient in amplitude and $I_R$ is, of course, sufficient in amplitude to operate the breaker (P) which most immediately and directly clears the fault.

In Cases III and IV, representing faults in line 12, similar proportionalities and phase relationships of the currents develop to clear the faults on that line as in the Cases I and II with line 10. Notice in Cases III and IV that $I_0$ and $I_R$ are out of phase, indicating that breaker Q should be tripped.

Figure 2:
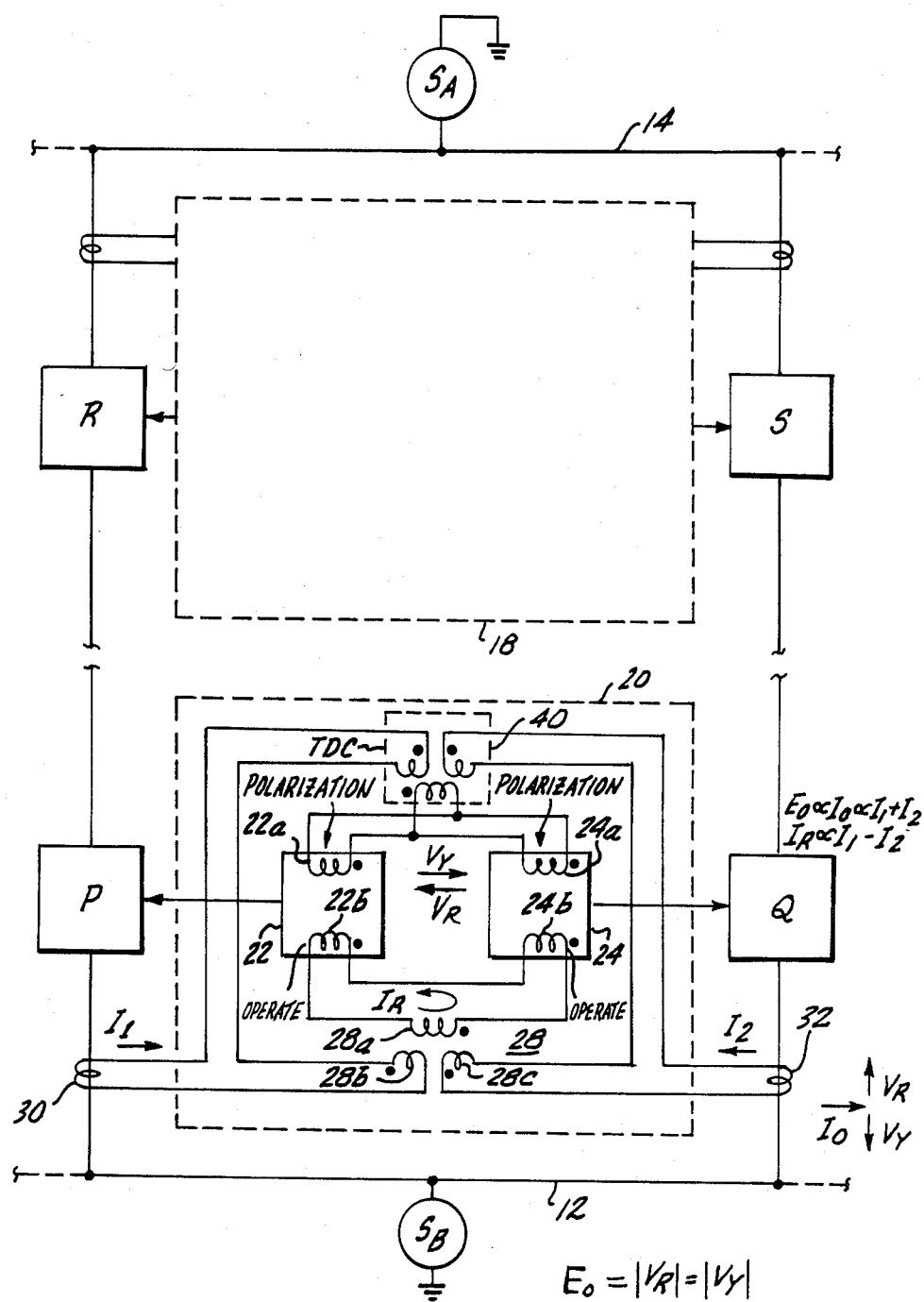
FIG. 2 is a view similar to FIG. 1 using a transformer drop compensator arrangement for energizing the polarization windings of the breaker-tripping relays, as a modification of the embodiment shown in FIG. 1.
Figure 3:
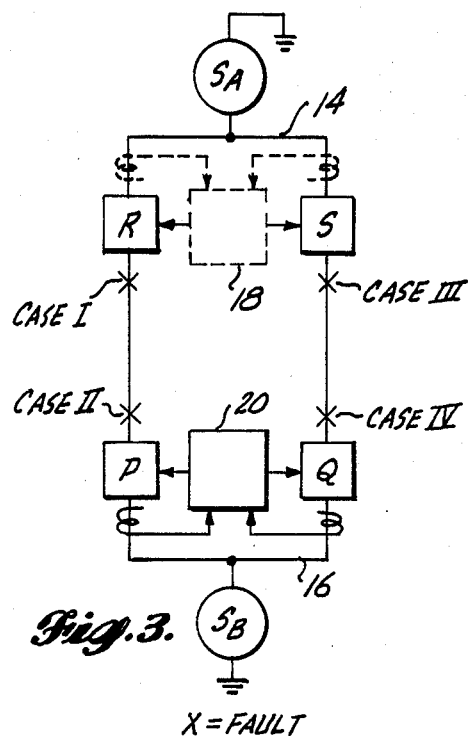
FIG. 3 depicts four different representative line fault locations in a dual parallel line system under protection in accordance with the invention.
Figure 4:
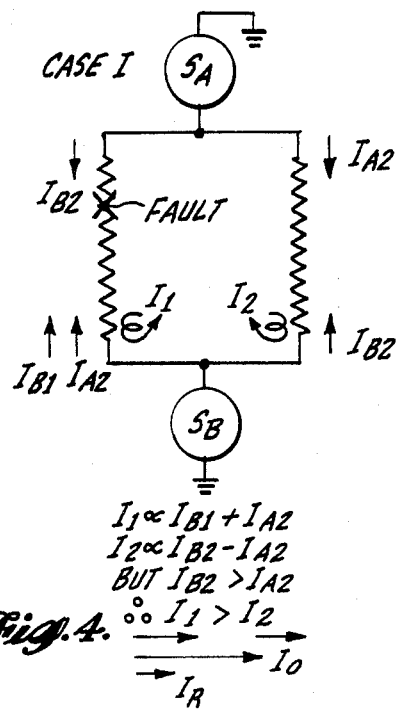
FIGS. 4 through 7 illustrate derivation of currents to operate the breaker tripping relays in the respective four cases of line fault conditions depicted in FIG. 3 as applied to the system of FIG. 1.
Figure 5:
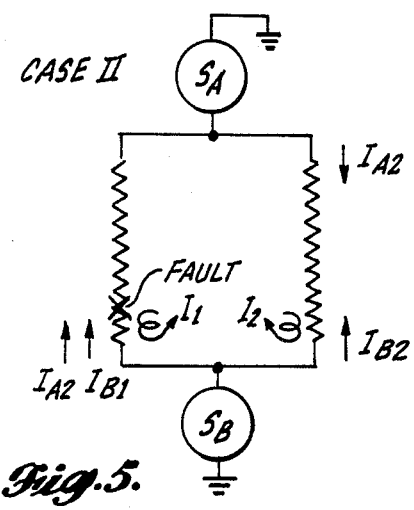
Figure 6:
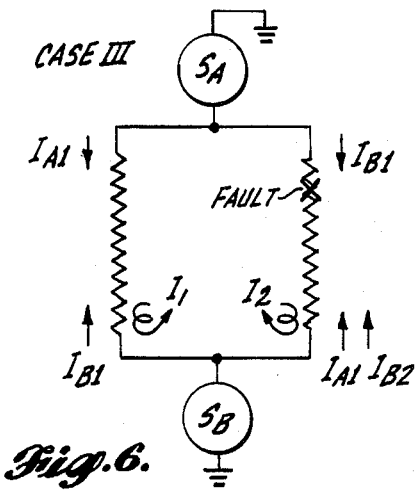
Figure 7:
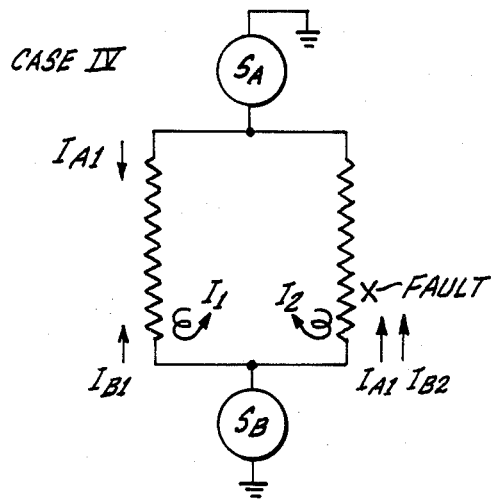

In the modified embodiment shown in FIG. 2, the arrangements are similar to those shown in FIG. 1 except that the current transformer 26 is replaced by a transformer drop compensator 40. In this instance, the secondary winding of transformer 40 produces a voltage which is applied directly to both polarization windings 22a and 24a of relays 22 and 24, which voltage in effect is proportional to the sum of the currents $I_1$ and $I_2$, namely $I_0$. Thus, the polarization windings 22a and 24a are similarly energized such that, depending upon whether $I_1$ exceeds $I_2$, relay 22 or relay 24 will be operated by a fault, which in turn depends upon which of the lines has the fault.

It will be noted that the system in each of its embodiments provides a direct and consistently reliable protection arrangement without the necessity for repeated and critical calibration of parts. Moreover, the improved system avoids erratic operation when line currents are high because, as previously explained, it operates with essentially the same degree of sensitivity to line current differences under high fault current conditions as it does under low fault current conditions.

While only particular embodiments have been disclosed herein, it will be readily apparent to persons skilled in the art that certain changes and modifications may be made, including the use of equivalent means, devices, and steps without departing from the essence of the invention as set forth in the claims that follow.

The embodiments of the invention in which an exclusive property or privilege is claimed are as follows:

1. A protective system for parallel connected alternating current transmission lines interconnecting independent electrical power sources and having approximately equal line impedances, said protective system comprising:

independent line-opening circuit breakers connected in each of the respective lines at one end thereof;

separate directional relays each respectively associated with one of the circuit breakers and connected to trip its associated circuit breaker when energized by operating current at and above relay pickup level, each of said relays having a polarization winding and an associated operate winding;

current detectors coupled to each of the respective transmission lines, said current detectors each individually operable to derive a control current proportional to the line current in its associated transmission line;

means connected to said current detectors for producing a summation current for energizing said polarization windings of said directional relays in proportion to the sum of the control currents derived by the current detectors; and means connected to said current detectors for producing a difference current for energizing each operate winding of said directional relays said difference current being proportional to the control current derived from one line subtracted from that derived from the other line such that the phasing between the summation and difference currents respectively energizes the polarization and operate windings of one of the relays, associated with a faulted transmission line, to cause that relay to pick up with its operate winding energized above a predetermined level while the other relay, associated with the nonfaulted line, does not pick up, the relative phasing in said polarization winding of the nonfaulted line relay being opposite the phasing in said faulted line relay.

2. The system defined in claim 1 wherein the means energizing the polarizing windings comprise the secondary of a current transformer having primaries connected to the respective current detectors.

3. The system defined in claim 1 wherein the means energizing the operate windings comprise the secondary of a current transformer having primaries connected to the respective current detectors.

4. The system defined in claim 1 wherein the means energizing the polarizing windings comprise the secondary of a current transformer having primaries connected to the respective current detectors, and the means energizing the operate windings comprise the secondary of a current transformer having primaries connected to the respective current detectors.

5. The system defined in claim 1 wherein the means energizing the polarizing windings comprise the secondary of a transformer drop compensator producing an output voltage applied to the polarization windings.

6. The system defined in claim 1 wherein the means energizing the polarizing windings comprise the secondary of a transformer drop compensator producing an output voltage applied to said polarization windings and wherein the means energizing the operate windings comprise the secondary of a current transformer having primaries connected to the respective current detectors.

* * * * *